United States Patent
Stählin

(10) Patent No.: US 11,073,402 B2
(45) Date of Patent: Jul. 27, 2021

(54) METHOD AND SYSTEM FOR EXCHANGING MAP DATA ACCORDING TO A QUALITY MEASUREMENT

(71) Applicant: Continental Teves AG & Co. oHG, Frankfurt (DE)

(72) Inventor: Ulrich Stählin, Oakland Township, MI (US)

(73) Assignee: Continental Teves AG & Co. OHG, Frankfurt (DE)

( * ) Notice: Subject to any disclaimer, the term of this patent is extended or adjusted under 35 U.S.C. 154(b) by 320 days.

(21) Appl. No.: 15/971,705

(22) Filed: May 4, 2018

(65) Prior Publication Data

US 2018/0252538 A1  Sep. 6, 2018

Related U.S. Application Data

(63) Continuation of application No. PCT/DE2016/200496, filed on Nov. 3, 2016.

(30) Foreign Application Priority Data

Nov. 5, 2015 (DE) ...................... 10 2015 221 748.5
Apr. 4, 2016 (DE) ...................... 10 2016 205 543.7

(51) Int. Cl.
*H04W 4/46* (2018.01)
*G01C 21/34* (2006.01)
(Continued)

(52) U.S. Cl.
CPC ........... *G01C 21/32* (2013.01); *G01C 21/005* (2013.01); *G08G 1/09626* (2013.01);
(Continued)

(58) Field of Classification Search
None
See application file for complete search history.

(56) References Cited

U.S. PATENT DOCUMENTS

2010/0036595 A1*  2/2010  Coy ..................... G08G 1/0104
                                                    701/119
2010/0217455 A1*  8/2010  Stahlin .................. G01C 21/32
                                                    701/1
(Continued)

FOREIGN PATENT DOCUMENTS

DE  102012024859 B3  1/2014
EP      1631790 A2   3/2006
(Continued)

OTHER PUBLICATIONS

International Search Report and Written Opinion dated Feb. 14, 2017 from corresponding International Patent Application No. PCT/DE2016/200496.
(Continued)

*Primary Examiner* — Adam D Tissot
*Assistant Examiner* — Laura E Linhardt

(57) ABSTRACT

A method for exchanging digital map data between a first and a second vehicle, each vehicle comprising a communication unit for exchanging messages between vehicles, a positioning unit for detecting the position of the vehicle, a map unit for storing and processing a digital map, and an evaluation unit for creating a quality measurement regarding a map section of the digital map. The method includes creation of a quality measurement regarding map data of a map section of the digital map by the first vehicle and checking of whether the quality measurement for the map data of the map section is below a threshold value which defines a minimum quality.

15 Claims, 1 Drawing Sheet

(51) Int. Cl.
*G08G 1/137* (2006.01)
*G01C 21/00* (2006.01)
*G08G 1/16* (2006.01)
*G08G 1/00* (2006.01)
*G01C 21/32* (2006.01)
*G08G 1/0967* (2006.01)
*G08G 1/0962* (2006.01)
*H04W 4/40* (2018.01)

(52) U.S. Cl.
CPC . *G08G 1/096716* (2013.01); *G08G 1/096741* (2013.01); *G08G 1/096783* (2013.01); *G08G 1/096791* (2013.01); *H04W 4/40* (2018.02)

(56) References Cited

U.S. PATENT DOCUMENTS

| | | | | |
|---|---|---|---|---|
| 2010/0241354 | A1* | 9/2010 | Stahlin | H04L 67/12 701/532 |
| 2011/0087433 | A1* | 4/2011 | Yester | G01C 21/32 701/301 |
| 2013/0083722 | A1* | 4/2013 | Bhargava | H04W 52/0209 370/315 |
| 2014/0274182 | A1* | 9/2014 | Menzel | H04B 7/04 455/509 |
| 2017/0343364 | A1* | 11/2017 | Mutsuga | G08G 1/00 |
| 2018/0242127 | A1* | 8/2018 | Kwoczek | H04L 69/14 |

FOREIGN PATENT DOCUMENTS

WO 2010133586 A1 11/2010
WO 2011153507 A2 12/2011

OTHER PUBLICATIONS

German Search Report dated Mar. 22, 2017 for corresponding German Patent Application No. 10 2016 205 543.7.

* cited by examiner

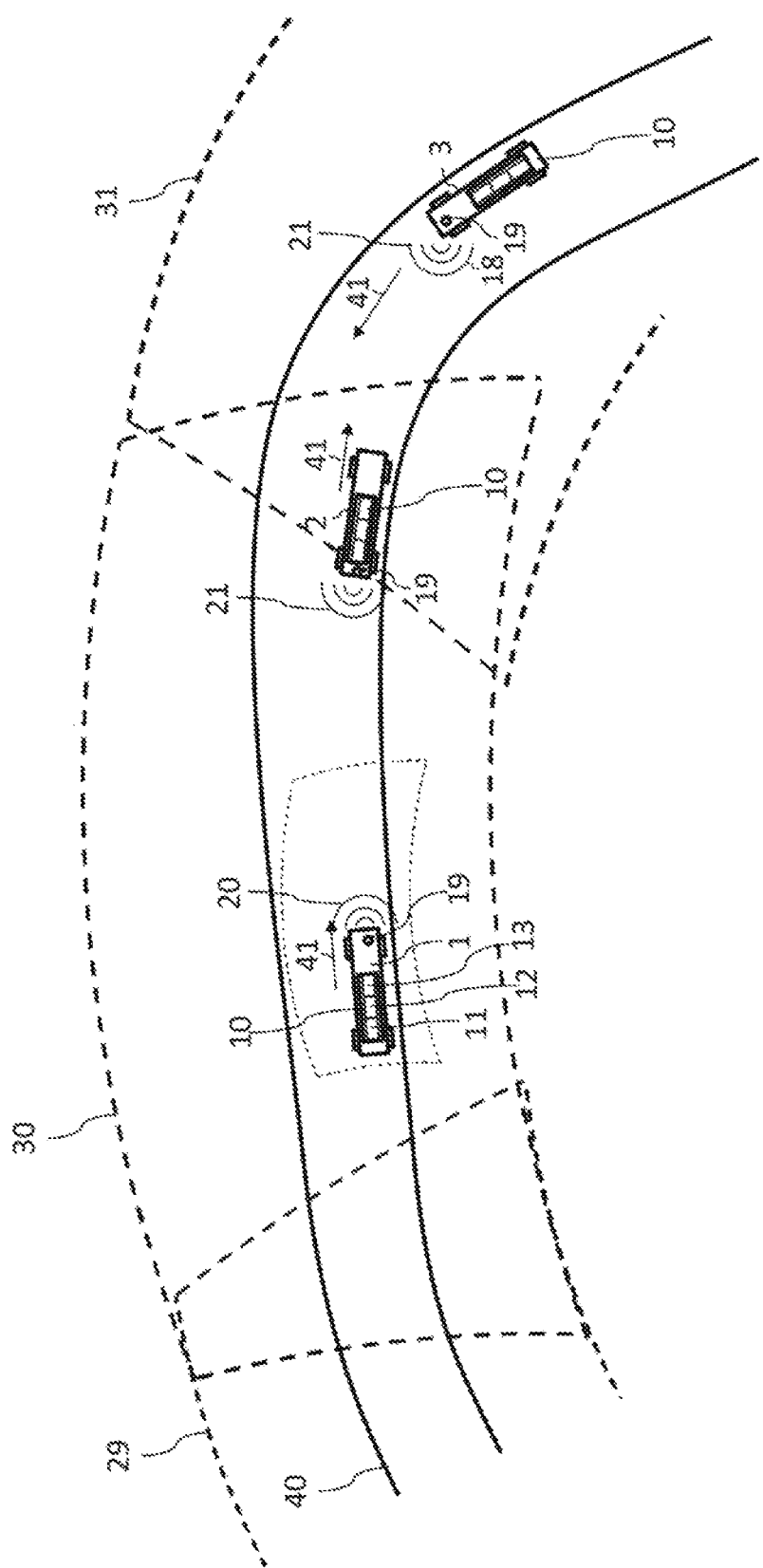

METHOD AND SYSTEM FOR EXCHANGING MAP DATA ACCORDING TO A QUALITY MEASUREMENT

CROSS REFERENCE TO RELATED APPLICATION

This application is a continuation of International application No. PCT/DE2016/200496 filed Nov. 3, 2016, which claims priority to German application Nos. 10 2015 221 748.5, filed on Nov. 5, 2015, and 10 2016 205 543.7, filed on Apr. 4, 2016, each of which is hereby incorporated by reference in its entirety.

TECHNICAL FIELD

The technical field relates to exchanging digital map data between vehicles.

BACKGROUND

The increasing use of driver assistance systems in vehicles with higher degrees of automation means that the importance of digital maps is also increasing, since these can be enlisted for the calculation and performance of driving maneuvers by the driver assistance systems. The combination of the driver assistance systems and vehicle-to-X communication is again improving the basis of information for decisions made by the driver assistance systems. However, the fact that complex structures of the traffic infrastructure such as, e.g., road structures, courses of roads, and courses of lanes across multiple roads, frequently cannot be clearly interpreted, is still disadvantageous. At such locations it is also possible for driving situations to occur, where the information content of vehicle-to-X messages is insufficient to make a clear decision for a driving maneuver.

SUMMARY

A method for exchanging digital map data between a first and a second vehicle is proposed, wherein the first vehicle and the second vehicle each include a communication unit for exchanging messages between vehicles, a positioning unit for detecting the position of the vehicle, a map unit for storing and processing a digital map, and an evaluation unit for creating a quality measurement regarding a map section of the digital map. The method includes creation of a quality measurement regarding map data and/or types of map data of a map section of the digital map by the first vehicle. The method also includes checking of whether the quality measurement for the map data of the map section is below a threshold value which defines a minimum quality. The method further includes transmission of a request message with a request for the transmission of map data if the quality measurement, in particular of the map section observed in each case, is below the threshold value. The method further includes reception of said message by means of a second vehicle. The method also includes transmission of a message with map data by the second vehicle, in particular regarding a map section around the position of the second vehicle. The method further includes reception of the message with map data regarding a map section by the first vehicle and processing of the received map data by the first vehicle, in particular integration of the received map data into the digital map of the first vehicle.

Vehicles having self-learning maps usually only collect sufficient and current map data for those regions which they also frequently drive through themselves. The map data or information regarding a map section can either be collected by traveling a route and/or by information from received vehicle-to-X ("V2X") messages. Map data regarding areas or routes, which are being driven through for the first time or which are only driven through sporadically, can therefore be sketchy, incomplete, and/or outdated. By exchanging map data with other vehicles, which are sufficiently good or respectively are of sufficient quality, i.e., the map data are complete, accurate, and up-to-date, map data having a high added value or user value can be disseminated while using the available communication bandwidth and data processing capacities as efficiently as possible. A request message may be sent if a requirement for further map data actually exists.

It should be noted that the method can be executed with more than two vehicles and is not restricted to two vehicles.

Furthermore, it should be noted that the method is, in principle, conceivable with any communication subscriber which has map data available and which can evaluate the map data. In particular, the method can also be conceivably carried out between a vehicle and a non-mobile communication partner, by way of example a so-called road side unit or respectively virtual traffic influencing device. These would not necessarily require a positioning unit, however, in this case, a communication unit and a map unit would, in particular, be provided.

Communication between the vehicles may be conducted by vehicle-to-X communication. The IEEE 802.11p protocol known from the prior art is very well suited to this, but other communication channels are not excluded.

The quality measurement constitutes a parameter for evaluating the map data, whether it is the vehicle's own map data or the received map data. The quality measurement can be established on the basis of different criteria or metrics, as described in further detail below. The quality measurement can, in this case, be established for individual types of map data within a map section and/or for the entirety of all the map data of a map section. The latter can also be established from the total individual quality measurements. The term 'data type' denotes a specific sort or group of information, e.g., data regarding lanes, construction sites, priority rules, etc.

A request message includes the request to the recipient that map data would be helpful. The request message can, but does not have to, contain useful data. In its simplest form, the request message contains an identifier or respectively ID, by way of example in the header of the message, in order to identify the request message as such. However, a position regarding which a map section is desired, by way of example, can also conceivably be inserted into the request message. This option can be helpful if map data regarding a specific position is to be supplemented. Failing this, the second vehicle can determine, either based on its own position or the map sections it has recently driven through, which map sections the map data being transmitted relate to.

According to a further development of the method, the request message is merely sent if at least a second vehicle is in the surroundings. It is therefore preferably checked, prior to the transmission of a request message with a request for the transmission of map data, whether at least a second vehicle is in the surroundings. In this case, the check can, by way of example, be effected on the basis of received messages, e.g., CAM messages and/or environment sensors. If, during the check, it is ascertained that no vehicle is in the surroundings, the outputting of a request message is expediently dispensed with. In this case, the term 'surroundings' denotes in particular a spatial area, within which the first vehicle can receive data from, or respectively transmit data to, a second or respectively further vehicle by means of the communication unit for exchanging messages between vehicles. The extent of this area is consequently dependent on many and varied factors such as, by way of example, the performance of the transceiver module used or the surroundings, by way of example buildings. Consequently, an unnecessary sending of request messages can advantageously be avoided and the bandwidth of the transmission means can be spared. If it is ascertained during the check that a vehicle is in the surroundings, the request message may be output.

The method is further developed in that, in order to create the quality measurement, it is considered what period of time has elapsed since the last time the map section was driven through. Outdated map data can be updated in this way.

The method is further developed in that, in order to create the quality measurement, it is considered how often journeys have been made within the map section. The plausibility of the map data can be increased in this way.

The method is further developed in that, in order to create the quality measurement, it is considered from how many other vehicles messages with map data, which are plausible with respect to one another or substantially the same, have already been received. In this way, specific map data can be confirmed as being plausible with a greater degree of certainty.

The method is further developed in that, in order to create the quality measurement, a weighted standard deviation between the received map data for this map section or respectively a particular map section is considered. In this way, the necessity for further map data for checking the plausibility and specifying the available map data can be established. The greater the deviation of the map data from one another, the higher the requirement for further map data.

It should be noted that the aforementioned embodiments for determining the quality measurement can be combined with one another and are based on types of map data and/or on the map data of a map section.

The method is further developed in that the message with map data is a MAP message. The MAP message is, in this case, a message which is defined in accordance with the SAE J2735 standard (last updated in September 2015). However, within the meaning of the disclosure, MAP messages, which are defined in accordance with other standards, which, by way of example, had not yet been finally decided upon or published at the time of the application but were under consideration, are not excluded. For example, ETSI/ISO are striving to develop further standards for MAP messages. Such MAP messages are to also be included by the invention. MAP messages are usually only sent by fixed infrastructure facilities, so-called road side units such as, e.g., traffic lights. The sending of MAP messages by means of vehicles is therefore a novelty. The advantage of this is that the predefined structures of the MAP message simplify an analysis and processing of the map data contained therein.

The following embodiments determine the way in which the request message is responded to. These options can be used as an alternative or in combination with each other. In particular, the response to the request message can conceivably be made dependent on a driving situation, the conditions within a map section or the technical conditions.

The method is further developed in that the message with map data includes all of the map data available in the second vehicle regarding a map section. This embodiment is particularly advantageous if sufficient communication bandwidth is available, but no separate analysis of the map data sent or respectively transmitted by other vehicles or communication subscribers is to take place.

The method is further developed in that the message with map data only contains map data or types of map data, for which the second vehicle has established a quality measurement above the threshold value. In this way, it is ensured that only maps having a higher quality are sent.

The method is further developed in that the second vehicle checks, prior to sending a message with map data, whether a comparable message has already been dispatched by another vehicle.

The method is further developed in that the second vehicle outputs its own message with map data. The fact that the request message has already been responded to is ignored. In this way, the redundancy of available map data is increased.

The method is further developed in that the second vehicle outputs a message with map data which are not contained in the map data already output by other vehicles. To this end, the map data already output has to be analyzed. Only those map data which are not yet known to the first vehicle are sent or respectively transmitted.

The method is further developed in that the second vehicle outputs a message with map data which differ from the map data already output by other vehicles. The term 'differ' here means a deviation between the map data.

The method is further developed in that the second vehicle does not send a message with map data. Faith is put in the fact that the map data already sent or respectively transmitted are sufficient. To this end, the map data already sent can be analyzed, by way of example, and, in the event that said data corresponds to the vehicle's own data, sending is dispensed with.

The method is further developed in that the sending of a request message is suspended if the communication bandwidth of the communication unit has exceeded a predefined full capacity limit.

The method is further developed in that a message with map data is not sent if the communication bandwidth of the communication unit has exceeded a predefined full capacity limit.

In an exemplary embodiment, a system for creating a digital map for a vehicle is proposed. The system includes a communication unit for exchanging messages between vehicles. The system also includes a positioning unit for detecting the position of the vehicle. The system further includes a map unit for storing and processing a digital map. The system also includes an evaluation unit for creating a quality measurement regarding a map section of the digital map.

The system is further developed in that the system transmits a request message with a request for the transmission of map data if the quality measurement is below the threshold value. The system may be alternatively or additionally configured in such a manner that a request message is simply transmitted if at least a second vehicle is in the surroundings.

The system is further developed in that the system transmits a message with map data regarding the map section around the vehicle's own position if it receives a request message.

Further advantageous embodiments of the system are set out in combination with the features of the embodiments of the method, in particular with regard to the establishment of the quality measurement as well as the embodiments for responding and designing the message with map data.

BRIEF DESCRIPTION OF THE DRAWINGS

The disclosed subject matter is described in greater detail below with reference to an embodiment example and a FIGURE, wherein:

FIG. 1 shows an embodiment example of the method according to one exemplary embodiment, and of the system according to one exemplary embodiment.

DETAILED DESCRIPTION

FIG. 1 shows multiple vehicles 1, 2, 3 on a road 40, which are each equipped with a system 10 for exchanging map data. The direction of travel of the vehicles 1, 2, 3 is accordingly represented by arrows 41. For the sake of simplicity, the reference numerals for the system 10 have only been drawn in on vehicle 1. However, the reference numerals are also to be read for vehicles 2 and 3.

The system 10 for creating a digital map for a vehicle comprises a communication unit 19 for exchanging messages between vehicles, a positioning unit 11 for detecting the position of the vehicle, and a map unit 12 for storing and processing a digital map. The system 10 additionally includes an evaluation unit 13 for creating a quality measurement regarding a map section 30, 31 of the digital map. The communication unit 19 includes an antenna (not shown) and a processing unit (not shown) for processing the received and transmitted data. It is conceivable that this processing unit also assumes functions of the map unit and the positioning unit. Within the meaning of the disclosure, the term 'unit' denotes a functional unit.

The quality measurement can be evaluated in accordance with individual or multiple criteria.

By way of example, the period of time which has elapsed since the last time the map section 29, 30 was driven through can be enlisted, in order to establish a quality measurement. Classes of quality measurements, e.g., A, B, C, can be defined, which are then linked to periods of time, e.g., 1 month, 6 months, etc. If the vehicle 1 ascertains that the time since the last journey in the map section 30 is already more than 6 months ago and this is below a threshold because of its low quality measurement, it dispatches a request message 19.

It can additionally be considered for the quality measurement how often journeys within the map section occur. Here as well, specific quality classes can be linked to specific threshold values for the number of times the map section is driven through, by way of example 10, 30, 50. Alternatively, a value between 0 and 1 can also be selected, wherein the maximum value 1 is attained on reaching a specific number of drive-throughs. If this criterion is then linked to the above criterion regarding the elapsed period of time of the last period of time, the up-to-date nature of the map data can also be considered in addition to the redundancy of the map data.

Furthermore, in order to create the quality measurement, it can be considered from how many other vehicles 2, 3 messages with map data, which are plausible with respect to each other, have already been received.

In addition, in order to create the quality measurement, a weighted standard deviation between the received map data 21 for the respective map sections 29, 30, 31 can be considered.

The quality measurement for the map sections 29, 30, 31 which have been driven through, are being driven through or which are to be driven through in the near future is established and checked in a meaningful way. However, it is alternatively possible, if computing capacity is available, to fundamentally check the digital map for its quality measurements as well and to make a note of those map sections where the quality measurement is below the threshold value. A request message can then be dispatched if a probability is identified that vehicles in the surroundings—in particular in the transmission and/or reception area of the communication unit 19—have the required map data, by way of example based on the number of vehicles in the surroundings, typical routes of vehicles, etc. In order to determine whether a vehicle is in the surroundings, information from environment sensors and/or received V2X messages, by way of example, can be enlisted. In order to save bandwidth of the transmission route, it can consequently be envisaged that the first vehicle checks whether any other vehicle is in the surroundings anyway, in order to be able to dispense with outputting of the request message if no other vehicle is present.

The procedure for exchanging the map data includes the following:

In a first step, the first vehicle 1 creates a quality measurement for map data of a map section 30, 31 of the digital map. The quality measurement can refer to map data of the map section 30, in which the first vehicle is located at that precise moment. Moreover, quality measurements can be created for map data which are located in other map sections, e.g. in a map section 31 which is to be driven through in future. It is equally conceivable that the quality measurement is established for a previous map section.

In a second step, the first vehicle 1 checks whether the quality measurement for the map data of the map section is below a threshold value which defines a minimum level of excellence or respectively quality. To this end, the total quality measurements for a map section or quality measurements for individual types of map data of a map section 29, 30, 31 can, in turn, be enlisted.

In a third step, the first vehicle 1 transmits a request message 20 with a request for the transmission of map data if the quality measurement for the map data of the map section 29, 30, 31 observed in each case is below the threshold value.

In the third step, this request message 30 is received by the other vehicles 2, 3.

In a fourth step, the other vehicles 2, 3 output a message with map data 21 regarding a map section 30, 31. The messages 21 with the map data are preferably sent as MAP messages or respectively messages. The structure of the messages can have a different configuration depending on the situation, as described in more detail below. The message 21 of the second vehicle 2 is received by the first vehicle 1, but also by the third vehicle 3. Likewise, the message of the third vehicle 3 is received by the first vehicle 1 and the second vehicle 2.

In a fifth step, the received messages with map data are processed by the first vehicle and, if applicable, integrated into its own digital map.

In a simple case where only the first and the second vehicle are located at a sufficient distance for the communication, the second vehicle 2 advantageously sends a message 21 with map data, which includes all the available map data regarding the respective map section 29, 30, 31. Said map data can, on the one hand, relate to the map section 30, in which the second vehicle is itself located and which, in this example, overlaps with the map section, in which the first vehicle 1 sending the enquiry is located. Alternatively, map data regarding multiple map sections 29, 30, 31 can also be sent.

Furthermore, the system can be configured in such a manner that the second and third vehicle 2, 3 send messages 21 with map data which only contain map data, for which the second and the third vehicle 2, 3 have established a quality measurement above the threshold value. In this way, the first vehicle 1 only receives map data which are of good quality and which also confirm each other, if applicable.

Depending on how large the time offset is between the sending of the messages with the map data between the second and third vehicles 2, 3, the second or third vehicle 2, 3 can check, prior to sending a message with map data, whether a comparable message has already been dispatched by another vehicle 2, 3. Said message is then examined so as not to dispatch duplicate data or information. It is true that the respective vehicle can subsequently, nevertheless, output its own message with map data, however this is only one option. Another option is that the respective vehicle 2, 3 outputs a message with map data which are not contained in the map data already output by other vehicles. Consequently, the map data reciprocally supplement themselves. Additionally or alternatively, the respective vehicle 2, 3 can output a message 21 with map data which differ from the map data already output by other vehicles or respectively deviate therefrom. The first vehicle 1 receiving the message must, in this case, carry out an assessment of the received map data. However, it is additionally possible that the respective vehicle 2, 3 does not send any message with map data, in order, by way of example, to avoid unnecessarily using the data channels or respectively the communication bandwidth.

To this end, it is advantageous to adapt the method and the system in such a manner that the sending of a request message is suspended if the communication bandwidth of the communication unit has exceeded a predefined full capacity limit, or if the communication bandwidth of the communication unit has exceeded a predefined full capacity limit.

The invention claimed is:

1. A method for exchanging digital map data between a first vehicle and a second vehicle, the first vehicle and the second vehicle each include a communication unit for exchanging messages between vehicles, a positioning unit for detecting the position of the vehicle, a map unit for storing and processing a digital map, and an evaluation unit for creating a quality measurement regarding a map section of the digital map, the method comprising:

creating a quality measurement regarding map data of a map section of the digital map by the first vehicle;

checking whether the quality measurement for the map data of the map section is below a threshold value which defines a minimum quality;

checking whether at least one further vehicle is in the surroundings in response to the quality measurement being below the threshold value;

when there is at least one further vehicle in the surroundings, transmitting a request message with a request for the transmission of map data if the quality measurement is below the threshold value;

receiving the request message at a second vehicle;

checking, by the second vehicle, whether a comparable message has already been dispatched by another vehicle prior to sending a message with map data;

transmitting a message with map data, which differ from map data already output by other vehicles, regarding the map section by the second vehicle; and receiving the message with map data by the first vehicle and processing of the received map data by the first vehicle, the message with map data is a MAP message supporting vehicle-to-X communication.

2. The method according to claim 1, further wherein creating the quality measurement includes considering the period of time elapsed since the last time the map section was driven through.

3. The method according to claim 1, wherein creating the quality measurement includes considering a frequency of journeys within the map section.

4. The method according to claim 1, wherein creating the quality measurement includes considering from how many other vehicles messages with map data, which are plausible with respect to one another, have already been received.

5. The method according to claim 1, wherein creating the quality measurement includes considering a weighted standard deviation of the received map data for the map section received from the second vehicle and other vehicles.

6. The method according to claim 1, wherein the message with map data includes all map data available in the second vehicle associated with the map section.

7. The method according to claim 1, wherein the message with map data only contains map data for which the second vehicle has established a quality measurement above the threshold value.

8. The method according to claim 1, wherein the second vehicle outputs its own message with map data.

9. The method according to claim 1, wherein the second vehicle outputs a message with map data which are not contained in the map data already output by other vehicles.

10. The method according to claim 1, wherein the second vehicle does not send a message with map data.

11. The method according to claim 1, further comprising suspending sending of a request message when the communication bandwidth of the communication unit exceeds a predefined full capacity bandwidth limit.

12. The method according to claim 1, further comprising not sending a message with map data when the communication bandwidth of the communication unit exceeds a predefined full capacity bandwidth limit.

13. A system for creating a digital map for a vehicle, the system comprising:

a communication unit configured to exchange messages between vehicles;

a positioning unit configured to detect the position of the vehicle;

an evaluation unit configured to create a quality measurement regarding a map section of the digital map, wherein when the quality measurement for the map data of the map section is below a threshold value which defines a minimum quality, the communication unit checks whether at least one further vehicle is in the surroundings in response to the quality measurement being below the threshold value, and, when there is at least one further vehicle in the surroundings, transmits a request message with a request for the transmission of map data and receives a message with map data, which differ from map data already output by other vehicles, regarding the map section from a second vehicle, the received message with map data is a MAP message supporting vehicle-to-X communication; and a map unit configured to store and process a digital map and the received map data.

14. The system according to claim 13, wherein the communication unit transmits a request message with a request for the transmission of map data if the quality measurement is below the threshold value.

15. The system according to claim 13, wherein the communication unit transmits a message with map data regarding the map section around the vehicle's own position if it receives a request message.

\* \* \* \* \*